(12) United States Patent
Masetto et al.

(10) Patent No.: US 7,294,173 B2
(45) Date of Patent: Nov. 13, 2007

(54) METHOD AND SYSTEM FOR DESORPTION AND RECOVERY OF DESORBED COMPOUNDS

(75) Inventors: Gian Claudio Masetto, Monza (IT); Mario Masetto, Monza (IT); Francesco Masetto, Monza (IT)

(73) Assignee: Polaris S.R.L., Monza (IT)

( * ) Notice: Subject to any disclaimer, the term of this patent is extended or adjusted under 35 U.S.C. 154(b) by 407 days.

(21) Appl. No.: 10/510,339

(22) PCT Filed: Apr. 7, 2003

(86) PCT No.: PCT/IB03/01247

§ 371 (c)(1),
(2), (4) Date: Oct. 5, 2004

(87) PCT Pub. No.: WO03/084644

PCT Pub. Date: Oct. 16, 2003

(65) Prior Publication Data

US 2005/0150379 A1  Jul. 14, 2005

(30) Foreign Application Priority Data

Apr. 5, 2002 (IT) .................... MI2002A0715

(51) Int. Cl.
*B01D 53/04* (2006.01)
(52) U.S. Cl. ............................. 95/148; 96/122; 96/126; 96/130; 96/144

(58) Field of Classification Search ............ 95/90, 95/106, 114, 115, 148; 96/108, 121, 122, 96/126, 127, 130, 143, 144, 146
See application file for complete search history.

(56) References Cited

U.S. PATENT DOCUMENTS

| 4,043,770 | A |   | 8/1977 | Jakob |
| 4,421,532 | A |   | 12/1983 | Sacchetti et al. |
| 4,480,393 | A |   | 11/1984 | Flink et al. |
| 5,671,612 | A | * | 9/1997 | Menzenski ................ 62/611 |
| 5,779,768 | A |   | 7/1998 | Anand et al. |
| 5,871,568 | A | * | 2/1999 | Gibson ..................... 96/122 |
| 6,572,686 | B1 | * | 6/2003 | Biernat et al. ............. 96/108 |

FOREIGN PATENT DOCUMENTS

| DE | 19503052 |   | 8/1996 |
| DE | 19527960 A1 | * | 1/1997 |
| EP | 0513704 |   | 4/1995 |

* cited by examiner

*Primary Examiner*—Frank M. Lawrence
(74) *Attorney, Agent, or Firm*—Emerging Strategies, PLLC

(57) ABSTRACT

A method for desorption and recovery of desorbed compounds, including the steps of generating a recirculating stream of inert gas (1), which passes through the material (2) to be desorbed, heating such inert gas stream to a temperature sufficient to cause the desorption process, yielding a gas effluent (3) from such recirculating stream of inert gas (1) in such a manner that the recirculated gas keeps a constant pressure, cooling such gas effluent to cause condensation of the desorbed compounds contained in such gas effluent (3), the cooling being obtained at least partly by pressure vaporization of a cryogenic fluid (4), and feeding such recirculating gas stream (1) by using at least a part of such pressure vaporized cryogenic fluid that was previously used to cool at least a part of the gas effluent (3).

16 Claims, 2 Drawing Sheets

METHOD AND SYSTEM FOR DESORPTION AND RECOVERY OF DESORBED COMPOUNDS

REFERENCE TO EARLIER APPLICATION

This Application is a U.S. national phase of International Application No. PCT/IB03/01247, filed Apr. 7, 2003, to Masetto, entitled Method And System For Desorption And Recovery Of Desorbed Compounds.

TECHNICAL FIELD

This invention relates to a method and a system for desorption and recovery of desorbed compounds.

BACKGROUND ART

It is a common practice to use the adsorption technique, on adsorbent beds of materials like activated carbons, macroporous resins, molecular sieves, zeolites and activated alumina, to separate volatile organic compounds (VOCs), as well volatile inorganic compounds, which are present as pollutants in gas emissions of industrial processes and, for process reasons, in liquid or gas mixtures which are formed in many industrial production processes.

It is also known to regenerate adsorbent materials to allow reuse thereof in several cycles, by means of desorption and recovery of the volatile compounds released from the adsorbent material, for reuse or disposal thereof.

For such purpose, adsorbent materials must be heated by convection (using steam or other fluids), or by conduction (indirect heat exchange), or by radiation (for example, using microwaves), to supply the adsorbed compounds with the energy needed for desorption thereof.

Although the use of steam is effective, it often causes partial hydrolysis of the compounds to be desorbed, and serious corrosion problems, and at all events the formation of huge amounts of condensed water mixtures to be processed to allow reuse or disposal thereof.

Indirect heat exchange, although associated with vacuum, requires unacceptable operation times for industrial applications, as adsorbent materials typically have a poor heat transfer coefficient.

U.S. Pat. No. 5,779,768 (ANAND) discloses regeneration of adsorbent materials by using a stream of hot inert gas, e.g. nitrogen, which passes through the material to be regenerated.

The gas stream provides a sufficient amount of heat energy for the adsorbed compounds to break their bonds with the adsorbent materials, and the hot stream strips the compounds released from the adsorbents, in form of vapors.

In steady conditions, the gas enriched in desorbed compounds is delivered, totally or partially, to a condenser where it is cooled to a temperature below the dew point, to obtain condensation of the adsorbed compounds (except a small portion that remains in the vapor phase), for reuse or disposal thereof.

According to this prior art technique, throughout the process, the whole gas stream must be simultaneously heated (upstream from the bed of material to be regenerated) and cooled (downstream from the bed); this also occurs in other prior art techniques.

When considering the high flow rates (usually at least twice the adsorption flow rates) that are needed to carry out regeneration in short times, the high temperatures required for regeneration of the adsorbent material and, conversely, the low cooling temperatures that are needed to condensate the separated volatile compounds, it is apparent that this prior art technique requires the simultaneous supply of huge healing and cooling powers to the gas stream used for desorption and recovery of volatile compounds.

Therefore, this prior art technique requires complex and expensive systems, particularly requiring high running costs, whose increase is inversely proportional to the cooling temperature required to obtain a good regeneration of the adsorbent material.

Also, it might produce an unsatisfactory level of adsorbent material regeneration, when compared with the increasingly strict emission limits prescribed in many countries for environment protection.

SUMMARY OF THE INVENTION

The object of the present invention is to provide a method and a system which might at least partly obviate the drawbacks of prior art techniques, and particularly reduce power consumption and improve the level of regeneration of adsorbent materials.

This object is achieved by a method described herein.

Further advantages may be obtained by the additional features described herein.

BRIEF DESCRIPTION OF THE DRAWINGS

A possible embodiment of method and system, according to the wording of the patent claims, will be described hereafter, whit reference to the attached drawings, in which:

DISCLOSURE OF THE INVENTION

Figure 1:
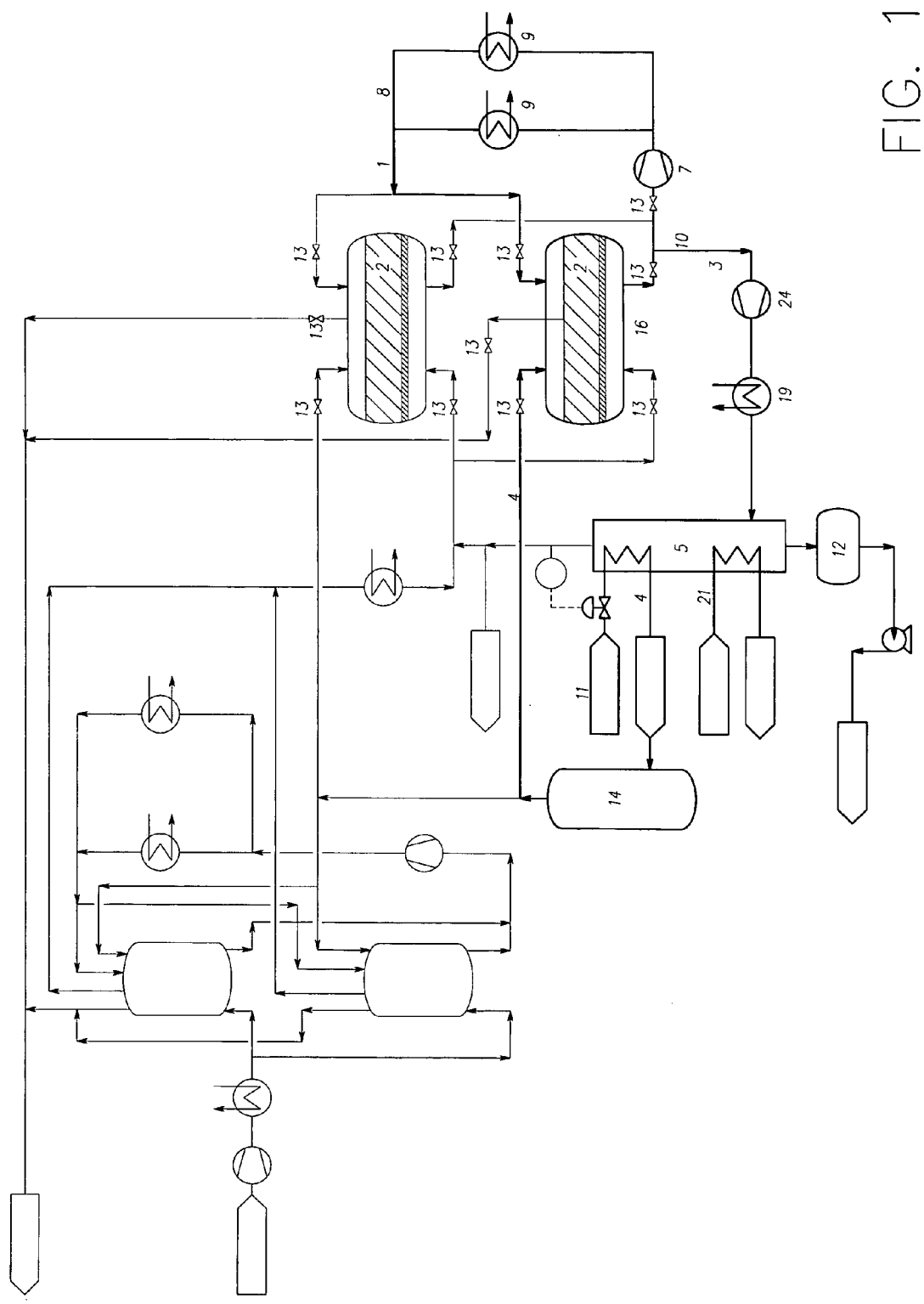
FIG. 1 is a flow diagram of a system designed for desorption and recovery of desorbed compounds according to a first embodiment.

With reference to the figures of this patent, the method for desorption and recovery of desorbed compounds includes the steps of generating a recirculating stream of inert gas 1, which passes through the material 2 to be desorbed, and heating such inert gas stream to a temperature sufficient to cause the desorption process.

The method further includes the steps of yielding a gas effluent 3 from the recirculating stream of inert gas 1, in such a manner that the recirculated gas 1 keeps a constant pressure, which would otherwise tend to increase because of both the rise of temperature and the release of volatile compounds following the desorption process, and delivering the gas effluent 3 to means 5 and 6, fit for cooling the gas effluent 3 and causing condensation of the desorbed compounds contained therein.

In steady conditions, the temperature of the recirculating gas stream 1 may be of 370 to 470° K, whereas the temperature of the gas effluent 3 inside the means 5 or 6 may be as low as 100 to 130° K, to obtain condensation of desorbed compounds.

The heating temperature depends on the nature of the adsorbent material to be regenerated, whereas the cooling temperature depends on the nature of the desorbed compounds to be recovered.

The means 5 and 6 for obtaining condensation of desorbed compounds may consist of a cryogenic condenser 5 or an internal reflux fractionation column 6, as the one described in detail in EP-B1-0513704, which is hereby incorporated by reference.

The cooling capacity of the above means 5 or 6 required for condensation of desorbed compounds is obtained, at least partly, by vaporization of a cryogenic fluid 4, i.e. by using a liquefied gas.

Inside the condenser 5, or fractionation column 6, the cryogenic fluid 4 evaporates under pressure, thereby absorbing heat from the gas effluent 3 coming from the recirculated stream 1.

The gas effluent 3, fully purified after the separation of volatile compounds, can be vented to the atmosphere, while the condensed desorbed compounds are recovered for further reuse or disposal.

The evaporated cryogenic fluid 4 used by the means 5 or 6 to cool the gas effluent 3 is further delivered, at least partly, to the recirculating stream 1, to allow clean gas addition to such stream 1.

In the preferred embodiment, the cryogenic fluid 4 is liquid nitrogen, which is particularly suitable because its dew point is lower than that of the compounds to be recovered, because it is easily available at a low price, and because it is inert and harmless for the environment.

In a preferred embodiment, pressurized nitrogen 4 is introduced in the recirculated stream 1 with the help of a storage tank 14.

By way of indication, the average flow rate of the nitrogen 4 introduced in the recirculated stream 1 may be about 1% of the flow rate of the recirculated stream 1.

The evaporated nitrogen 4 continuously introduced in the recirculating stream, as well as the continuously released desorbed volatile compounds, are continuously compensated for by the effluent 3, whereby the recirculated gas pressure 1 remains substantially constant with time.

Preferably, the average flow rate of the gas effluent 3 is below $1/50$ of that of the recirculated stream 1, and more preferably the flow rate of the gas effluent 3 is below $1/100$ of the flow rate of the recirculated gas stream.

Those skilled in the art will appreciate that this solution allows to operate at low cooling powers, thanks to the fact that not the whole gas stream passing through the material to be regenerated shall be cooled, but only a small part thereof (typically 1 to 2% of the hot gas stream that passes through the material to be regenerated).

Due to the possibility of using low cooling powers, it is technically and commercially advantageous to use liquefied gas as a coolant; this allows to operate at very low temperatures, and to obtain an effective removal of the desorbed compounds contained in the gas effluent 3.

Those skilled in the art will also appreciate that this solution allows to operate, in steady conditions, with very low heating powers, thanks to the fact that the recirculated stream 1 is not simultaneously cooled; by simply heating the clean gas 4, introduced into the stream closed loop, the gas effluent 3 may be compensated for and the heat energy released to the adsorbent material and to the system may be reintegrated.

Yet, those skilled in the art will appreciate that the continuous introduction of clean gas into the recirculating stream 1 allows a better regeneration of the adsorbent material 2, due to the reduced concentration of desorbed compounds, which provides a favourable condition for desorption.

In order to obtain full regeneration of the material 2, the desorption process preferably includes the additional steps of stopping the delivery of the evaporated cryogenic fluid 4, stopping the circulation of the recirculating gas stream 1 and sucking in the recirculated gas 1 until a negative pressure is generated inside the bed of the adsorbent material to be regenerated 2, in such a manner as to create new favorable thermodynamic conditions for desorption.

The required energy is provided by the heat capacity of the (adsorbent and adsorbed) materials, which are cooled thereby.

All the above steps may be repeated several times, to obtain a more effective regeneration of the adsorbent material.

The above method may be implemented by using a system for desorption and recovery of desorbed compounds, which comprises a closed loop 8, with a vessel 16, containing a bed of adsorbent material 2, and means 7 for generating a recirculating stream of inert gas 1 in the closed loop 8.

Typically, the means 7 for generating a recirculating stream of inert gas 1 include a fan 7, which keeps the flow rate and the pressure of the recirculating stream 1 at a substantially constant level with time.

Means 9 are further provided for heating the recirculated gas stream 1 in the closed loop 8, which means 9 may typically include a steam heat exchanger, or hot oil heat exchanger or a resistive heat exchanger.

A duct 10 branches off the closed loop 8 to allow discharge of the effluent 3, caused by gas pressure and volume increases in the loop 8, so as to keep the average internal pressure value of the recirculating gas in the loop 8 substantially constant with time.

A cryogenic condenser 5, or an internal reflux fractionation column 6 is provided to receive the effluent 3 from the duct 10.

In the embodiment as shown in FIG. 1, the cryogenic condenser 5 is fed, in its lower portion, with a coolant 21 (such as cold water) and, in its higher portion, with liquid nitrogen coming from a tank 11.

Preferably, the gas effluent 3 is pre-cooled, before being introduced into the cryogenic condenser 5, by using cooling means 19.

An inexpensive coolant for the cooling means 19 may be cooling tower water.

After the purification, the gas effluent 3 may be released to the atmosphere, whereas the condensed desorbed compounds are collected in a special tank 12, possibly cooled if gas is in the liquid phase.

The cryogenic condenser 5 is cooled by using liquid nitrogen 4, delivered from a tank 11, and evaporating under pressure in the condenser 5.

The nitrogen outflown from the condenser 5 or the fractionation column 6 is delivered under pressure to a storage tank 14 and from the latter to the closed loop 8.

The desorption system further includes special cutoff means 13, which are designed to stop the evaporated cryogenic fluid supply 4 to the closed loop 8, means 24 for sucking in the gas contained in the closed loop 8 to generate a pressure below atmospheric pressure in the container 6.

Preferably, the means 24 consist of a vacuum pump which may decrease the pressure inside the container to values of about 2 to 5 mBar.

Those skilled in the art will appreciate that the method may favor the use of macroporous resins in volatile and liquid organic and inorganic compound adsorption processes.

These resins are not widely used in prior art, due to their thermal lability, which prevents regeneration thereof at high temperatures, which drawback is obviated thanks to the new technique, by implementing a heating protocol at relatively low temperatures and a desorption protocol at high vacuum degrees, and by using an inert heating medium that does not interact chemically with the adsorbent material.

The advantages of these resins are their low adsorption and desorption power requirements, the absence of active catalysis sites, the latter being present in activated carbons, and consequent benefits in terms of lower management costs and a higher operational safety.

Furthermore, the new technique provides full removal of volatile impurities captured by the resins during manufacture, which might prevent them from being used in the medical and biotechnological fields.

Figure 2:
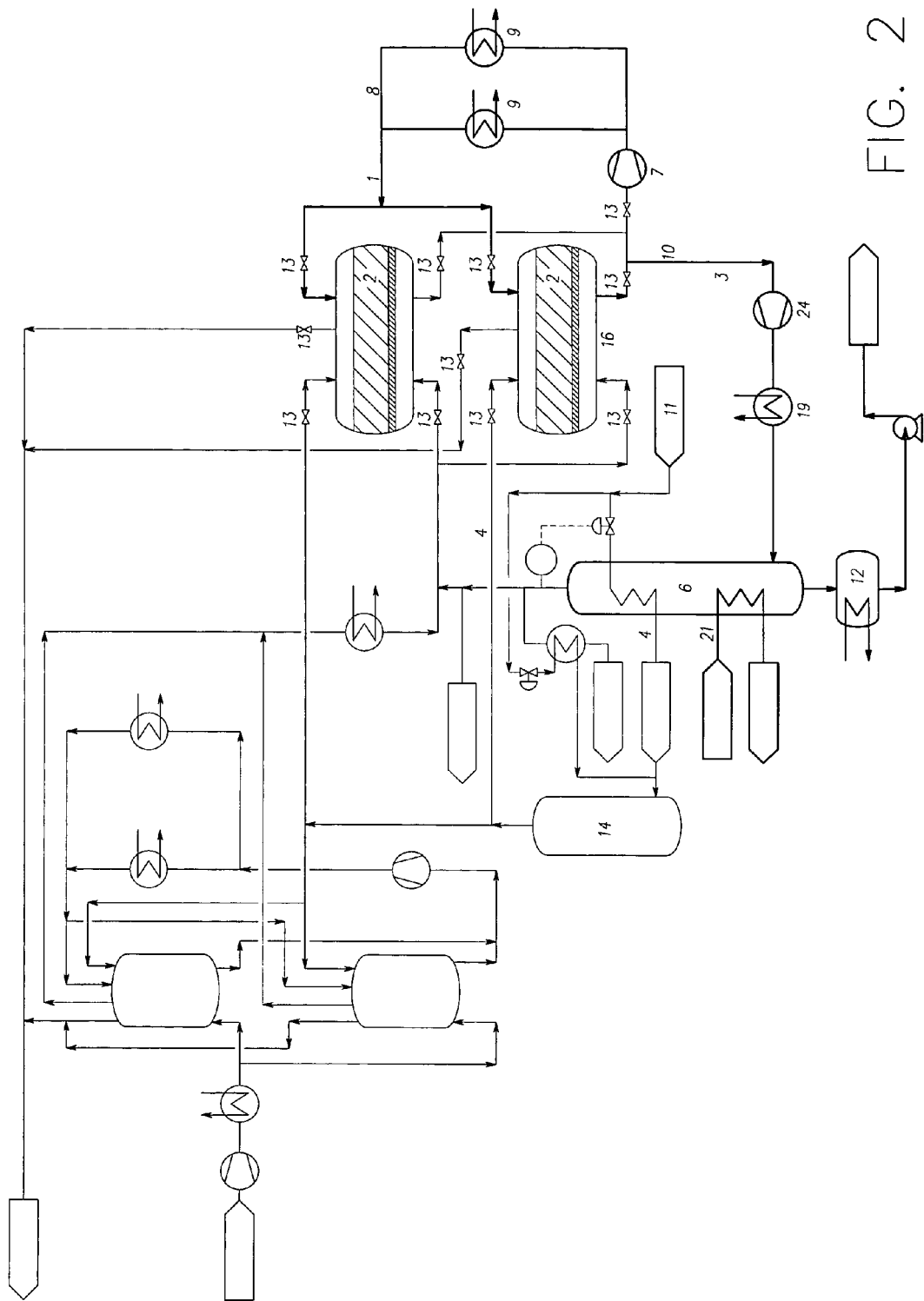
FIG. 2 is a flow diagram of a system designed for desorption and recovery of desorbed compounds according to a further embodiment.

Finally, those skilled in the art will appreciate that the use of an internal reflux fractionation column 6 for cryogenic condensation, as shown in FIG. 2 provides a simultaneous fractionation of the desorbed compounds supplied thereto, even when the latter are composed of gas mixtures.

Fractioning may be completed in the same column, thereby providing further savings on investment and management costs.

In the embodiments of FIGS. 1 and 2, the desorption system can alternately operate on two vessels 16.

Hence, one of the two vessels 16 is always ready for adsorption of the gas emissions to be cleaned.

EXAMPLE 1

By using the system design of FIG. 1, corresponding to the preferred embodiment of this invention, the following results were obtained for a representative case of removal and recovery of volatile organic compounds, by only using liquid nitrogen in the cryogenic condenser:

| Stream inlet conditions | Stream outlet conditions |
|---|---|
| Temperature 40° C. | Temperature 35° C. |
| Pressure AP | Pressure AP |
| Flow rate 9,535 kg/h | Flow rate 9,122 kg/h |

| Composition w/w | Composition |
|---|---|
| Acetone 0.42% | Acetone 9 mg/m3 |
| Methylene chloride 1.15" | Methylene chloride 10" |
| Isopropyl alcohol 0.33" | Isopropyl alcohol 16" |
| Moisture 1.91" | Moisture None |
| Air 95.66" | Air remaining percentage |

Outlet Conditions of the Stream from the Cryogenic Condenser

Temperature −130° C.

Pressure AP (Average) flow rate 160 kg/h

Composition

Acetone 1 mg/m$^3$

Methylene Chloride 2 mg/m$^3$

Isopropyl alcohol undetectable

Moisture None

Oxygen (blowdown) 20% to 1%

Oxygen (regen.) traces

Nitrogen remaining percentage

Solvent Recovery Yield 99.85% (724.3 out of 725.4 introduced per cycle)

The above performances may be obtained with the following system:

Bed of activated carbon 6000 kg

Adsorption cycle 4 hours

Desorption cycle 4 hours

Adsorption temperature 30° C.

Desorption temperature 160° C.

Flow rate in the desorption loop 20000 m$^3$/h

Temp. at the inlet of the cryogenic condenser 50° C.

Absolute min. press. upon desorption 0.5 mbar

Pressure of the recovered nitrogen 6 barG

Power consumption per cycle 280 kWh

Nitrogen consumption per cycle 640 kg

Steam consumption per cycle 830 kg

Cooling water (cycle) 30 m$^3$

Pre-cooling water (cycle) 720000 kcal

EXAMPLE 2

By using the system design as shown in FIG. 2, corresponding to a second preferred embodiment of this invention, an internal reflux column being integrated therein, the following results were obtained for a representative case of removal and recovery of volatile organic compounds simultaneous with fractionation thereof, by only using liquid nitrogen and cooled glycol in the cryogenic internal reflux column:

| Stream inlet conditions | Stream outlet conditions |
|---|---|
| Temperature 50° C. | Temperature 35° C. |
| Pressure AP | Pressure AP |
| Flow rate 880 kg/h | Flow rate about 880 kg/h |

| Composition w/w | Composition |
|---|---|
| Freon 11 1.29% | Freon 11 6 mg/m$^3$ |
| n-Pentane 0.41 | n-Pentane 2 mg/m$^3$ |
| Moisture 1.63 | Moisture None |
| Air remaining percent. | Air remaining percent. |

Outlet Conditions of the Stream from the Cryogenic Internal Reflux Column after Final Condensation Temperature −150° C.

Pressure AP (Average) flow rate 40 kg/h

Composition

Freon 112 mg/m$^3$ n-Pentane none

Moisture None

Oxygen (blowdown) 20% to 1%

Oxygen (regen.) traces

Remaining nitrogen

Solvent recovery yield 99.96% (59.82 out of 59.84 introduced per cycle)

Recovered Freon (cycle) 45.4 kg

Recovered n-Pentane (cycle) 14.4 kg

The above performances were obtained by using the following system:

Bed of activated carbons 600 kg

Absorption cycle 4 hours

Desorption cycle 4 hours

Adsorption temperature 35° C.

Desorption temperature 160° C.

Flow rate in the desorption loop 1600 m$^3$/h

Temp. at the inlet of the cryogenic condenser 50° C.

Min. press. upon desorption 0.5 mbar

Pressure of the recovered nitrogen 6 barG

Power consumption per cycle 54 kWh

Nitrogen consumption per cycle 210 kg

Steam consumption per cycle 120 kg

Cooled water for regeneration 4 m$^3$

Cooled water for the column 90000 kcal

The above power consumptions include those used for fractioning the Freon 11 and the n-Pentane.

We claim:

1. A method for desorption and recovery of desorbed compounds from a material, comprising:
   generating a recirculation stream of inert gas, which passes through the material to be desorbed;
   heating the recirculation stream of inert gas to a temperature sufficient to cause a desorption process;
   yielding a gas effluent from the recirculation stream of inert gas in such a manner that the recirculation stream of inert gas maintains constant pressure;
   delivering the gas effluent to cooling means adapted for cooling the gas effluent;
   cooling the gas effluent to cause condensation of the desorbed compounds contained in the gas effluent, said cooling being obtained at least partly by pressure vaporization of a cryogenic fluid; and
   feeding the vaporized cryogenic fluid into the recirculation stream of inert gas;
   wherein the cryogenic fluid is liquid nitrogen.

2. The method of claim 1, wherein the gas effluent is from the recirculation stream of inert gas with a flow rate that is below 1/50 of a flow rate of the recirculation stream of inert gas.

3. The method of claim 1, wherein said cooling of the gas effluent is performed by way of a cryogenic condenser.

4. The method of claim 2, wherein said cooling of the gas effluent is performed by way of a cryogenic condenser.

5. The method of claim 1, wherein said cooling of the gas effluent is performed by way of an internal fractionation column.

6. The method of claim 2, wherein said cooling of the gas effluent is performed by way of an internal fractionation column.

7. The method of claim 1, further comprising:
   stopping feeding of the vaporized cryogenic fluid, which is used to cool at least a part of the gas effluent, into the recirculation stream of inert gas;
   stopping the circulation of the recirculation stream of inert gas;
   sucking in the recirculation stream of inert gas to generate a negative pressure in a bed of the material to be desorbed and regenerated; and
   delivering sucked gas to the cooling means.

8. The method of claim 7, wherein said cooling of the gas effluent is performed by way of a cryogenic condenser.

9. The method of claim 7, wherein said cooling of the gas effluent is performed by way of an internal fractionation column.

10. A method for desorption and recovery of desorbed compounds from a material, comprising:
    generating a recirculation stream of inert gas which passes through the material to be desorbed;
    heating the recirculation stream of inert gas to a temperature sufficient to cause a desorption process;
    yielding a gas effluent from the recirculation stream of inert gas in such a manner that the recirculation stream of inert gas maintains constant pressure;
    delivering the gas effluent to cooling means adapted for cooling the gas effluent;
    cooling the gas effluent to cause condensation of the desorbed compounds contained in the gas effluent, said cooling being obtained at least partly by pressure vaporization of a cryogenic fluid;
    feeding the vaporized cryogenic fluid into the recirculation stream of inert gas, the cryogenic fluid being liquid nitrogen;
    stopping feeding of the vaporized cryogenic fluid, which is used to cool at least a part of the gas effluent, into the recirculation stream of inert gas;
    stopping circulation of the recirculation stream of inert gas;
    sucking in the recirculation stream of inert gas to generate a negative pressure in a bed of the material to be desorbed and regenerated; and
    delivering sucked gas to the cooling means.

11. The method of claim 10, wherein said cooling of the gas effluent is performed by way of a cryogenic condenser.

12. The method of claim 10, wherein said cooling of the gas effluent is performed by way of an internal fractionation column.

13. A system for carrying out the method of claim 1, comprising:
    a closed loop including a vessel that contains a bed of adsorbent material;
    gas generating means for generating a recirculation stream of inert gas in said closed loop with said vessel;
    heating means for heating the recirculation stream of inert gas in said closed loop;
    a cryogenic condenser, which is at least partly circulated and cooled by a cryogenic fluid that is pressure vaporized;
    a duct for connecting said closed loop to said cryogenic condenser to feed a gas effluent coming from said closed loop to said cryogenic condenser; and feeding means for feeding a part of the vaporized cryogenic fluid from said cryogenic condenser to said closed loop, the cryogenic fluid being liquid nitrogen.

14. The system of claim 13, further comprising:

cutoff means for stopping feed of vaporized cryogenic fluid to said closed loop; and suction means for sucking in the recirculation stream of inert gas in said closed loop to generate a negative pressure in said vessel.

15. A system for carrying out the method of claim 1, comprising:

a closed loop including a vessel that contains a bed of adsorbent material;

gas generating means for generating a recirculation stream of inert gas in said closed loop with said vessel;

heating means for heating the recirculation stream of inert gas in said closed loop;

an internal reflux fractionation column, which is at least partially cooled by a cryogenic fluid that is pressure vaporized;

a duct for connecting said closed loop to said internal reflux fractionation column to feed a gas effluent coming from said closed loop to said internal reflux fractionation column; and feeding means for feeding a part of the vaporized cryogenic fluid from said internal reflux fractionation column to said closed loop, the cryogenic fluid being liquid nitrogen.

16. The system of claim 15, further comprising:

cutoff means for stopping feed of vaporized cryogenic fluid to said closed loop; and suction means for sucking in the recirculation stream of inert gas in said closed loop to generate a negative pressure in said vessel.

* * * * *